United States Patent
Miklosi et al.

(12) 
(10) Patent No.: US 6,435,606 B1
(45) Date of Patent: Aug. 20, 2002

(54) MOTOR VEHICLE CONVERTIBLE STRUCTURE WITH REMOVABLE SIDE MEMBERS

(75) Inventors: Stefan Miklosi, Munich; Burkhard Reinsch, Kaufbeuren, both of (DE)

(73) Assignee: Webasto Dachsysteme GmbH, Stockdorf (DE)

( * ) Notice: Subject to any disclaimer, the term of this patent is extended or adjusted under 35 U.S.C. 154(b) by 0 days.

(21) Appl. No.: 09/641,765

(22) Filed: Aug. 21, 2000

(30) Foreign Application Priority Data

Aug. 21, 1999 (DE) .......................... 199 39 724

(51) Int. Cl.⁷ ................................. B60J 7/06
(52) U.S. Cl. .................. 296/216.07; 296/219

(58) Field of Search ................. 296/219, 223, 296/107.15, 107.16, 2, 6.07

(56) References Cited

U.S. PATENT DOCUMENTS 2,210,590 A * 8/1940 Jobst ..................... 296/219
5,558,388 A 9/1996 Fürst et al. ............ 296/108 X

* cited by examiner

*Primary Examiner*—Dennis H. Pedder
(74) *Attorney, Agent, or Firm*—Nixon Peabody LLP; David S. Safran

(57) ABSTRACT

A motor vehicle roof structure with at least one openable roof part (3) which is movably guided in the area of the side members (11) has side members (11) which are detachably connected to vehicle-mounted parts, such as the A column (10) and the B column (28) of the vehicle body, by a plug-in/locking mechanism.

15 Claims, 4 Drawing Sheets

MOTOR VEHICLE CONVERTIBLE STRUCTURE WITH REMOVABLE SIDE MEMBERS

BACKGROUND OF THE INVENTION

1. Field of the Invention

The invention relates to a motor vehicle roof structure with at least one roof part which is guided to be able to move in the area of the side members.

2. Description of Related Art

In conjunction with one such motor vehicle roof structure on a convertible, collapsibly coupling the side members to the B columns is known. This approach is complex and therefore can only be accomplished at high cost (see the German publication: ATZ 96 (1194) 4, p. 245 ff and U.S. Pat. No. 5,558,388).

SUMMARY OF THE INVENTION

In view of this prior art, the object of this invention is to improve a motor vehicle convertible structure of the initially mentioned type with respect to handling of the side members.

This object is achieved in a structure with at least one roof part which is movably guided in the area of the side members by the side members being detachably connected to vehicle-mounted parts, such as the A column and the B column of the vehicle body, by a plug-in and locking mechanism.

Accordingly, in other words, the invention calls for separate execution of the side members from the remaining convertible roof structure and their removability and reinstallation capacity on the A and B columns of the vehicle body, and the installation process for the side members can be comfortably executed by means of a plug-in/locking mechanism. In addition, the approach in accordance with the invention has the advantage that the side members which have been removed from the area of the roof can be easily stowed, for example, in the trunk, without interfering with the appearance of the vehicle.

To ensure mounting and dismounting of the side members without problems when the vehicle body is exposed to twisting forces, for example, when parking with one or two wheels on the sidewalk (as is common outside of the U.S.), it is advantageously provided that the plug-in/locking mechanism be made such that the mounted side members are suspended "flexibly" relative to the vehicle body. This flexible suspension, which can also be called floating support of the side members without the introduction of bending moments into the side members, accordingly calls for limited mobility of the side members except for torsion. The closed support of the side members and their locking are such that, in spite of flexible or floating support of the side members, they are fixed on the body in the mounting position.

A host of mechanisms are possible as the plug-in/locking mechanism for the removable side members. One advantageous embodiment of this mechanism in accordance with the invention calls for the closed support to be located on one end of the side member, while the catch lock is made on the other end of the side members. This separate closed support and catch lock allow axial play for the side members in order to ensure the aforementioned floating support thereof.

Peripherally to the plug-in and locking functions which are distributed onto the ends of the side members, it is advantageously provided that the respective closed bearing forms a receiver of one end of a side member, a receiver which is torsionally strong relative to the lengthwise axis of the side member and when the catch lock of the other end of the side member is released for mounting and dismounting of the side member, the closed bearing allows swivelling of the side member transversely to the lengthwise axis of the side member. Here, it is fundamentally irrelevant which of the bearing components is located on the A column and which is located on the B column of the motor vehicle body.

To form the closed bearing, numerous versions can be used. In accordance with the invention, for the closed bearing, a ball head connection between the respective column and the end of the side member and rotary locking of the ball head connection with reference to the lengthwise axis of the side member are preferable. This rotary lock can be made, for example, in the form of a journal which fits into a recess. In this embodiment of the closed bearing the play necessary for the floating suspension of the side members is made available by the bearing on the other end of the member.

Alternatively to the aforementioned closed bearing design, the closed bearing can have a swivel connection with a swivel axis transversely to the side member and a claw which extends over the latter with play and which is preferably pressed against the swivel axis under a spring force.

Each of these swivel bearing designs makes it possible to detach the side member from the vehicle body by releasing the locking mechanism on one end and swivelling the side member around the closed bearing on the other end transversely to the lengthwise extension of the side member and removing it from the closed bearing. Mounting is performed with the reverse sequence of the above explained steps.

The catch lock on the end of the side member opposite the closed bearing comprises, preferably, a catch element and a locking element which detachably fixes it. Here, with regard to function, it is irrelevant whether the catch element or the locking element is located on the side member or on the respective body column.

According to one preferred embodiment, the catch element has a ball head connection which is supported to be able to move in the lengthwise direction of the side member and which allows easy locking and unlocking as a result of the sliding support. Alternatively, the catch element can have a pin which fits behind a centering opening in a lock part which forms the locking element with play and is pretensioned by a spring. Advantageously, the lock part is a component of a locking stopper which can be moved in the pin release position against the pre-tensioning of a spring and which is pre-tensioned in the locking position under pre-tensioning of a spring. This results in that, while ensuring the floating support of the side member, on this end of the side member, the side member locking can be actuated without controls in the interior of the vehicle.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 2A is an enlarged sectional view of the encircled detail of FIG. 2 taken along line A—A therein;

DETAILED DESCRIPTION OF THE INVENTION

Figure 1:
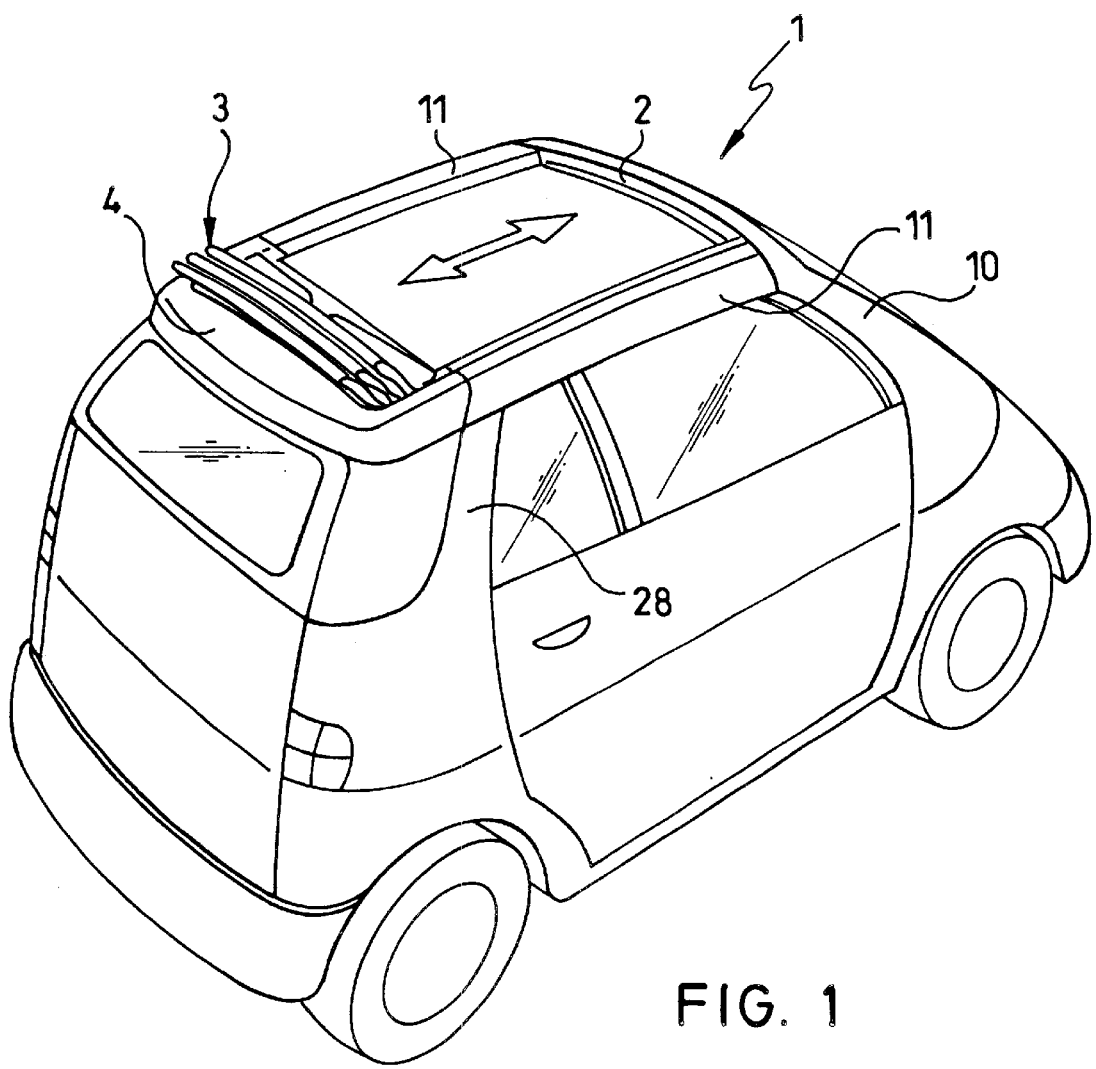
FIG. 1 is a perspective schematic view of a motor vehicle with removable side members.

The vehicle 1 which is shown in FIG. 1, at the top, bordering the windshield, has a front cross member in the form of an apron 2, front A columns 10 bordering the windshield laterally and rear B columns 28 which adjoin the rear side of the side doors and which are connected on either side by a side member 11. Between the side members 11 an openable roof part 3 which is made in this embodiment as a folding roof is movably guided. In the full open position, this openable roof part can be inserted into a roof cassette 4 which lies to the rear and can be locked there so that subsequently the side members 11 can be detached from the A column 10 and the B column 28. The motor vehicle 1, after removing the side members 11 has a large, Targa-like roof opening. In another embodiment, which is not the subject matter of this invention, the roof cassette 4 with the openable roof part 3 held therein can be deposited in a rear stowage space by swivelling, by which the roof opening is widened into a large convertible-like roof opening.

Figure 2:
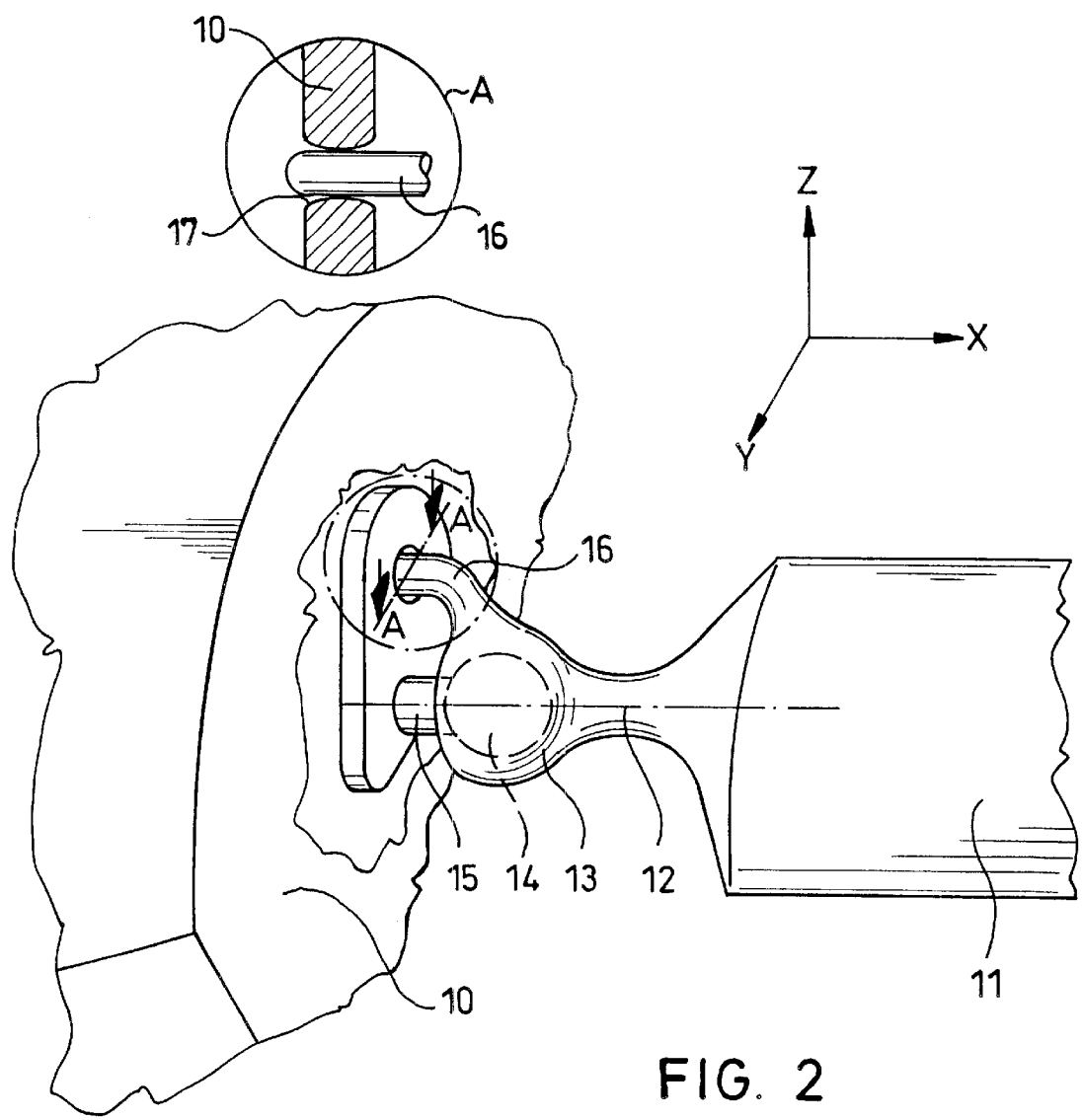
FIG. 2 is a perspective view of the closed bearing on one end of a side member of a convertible roof structure for fixing this side member on the A-column of a motor vehicle in accordance with an embodiment of the invention.
Figure 4:
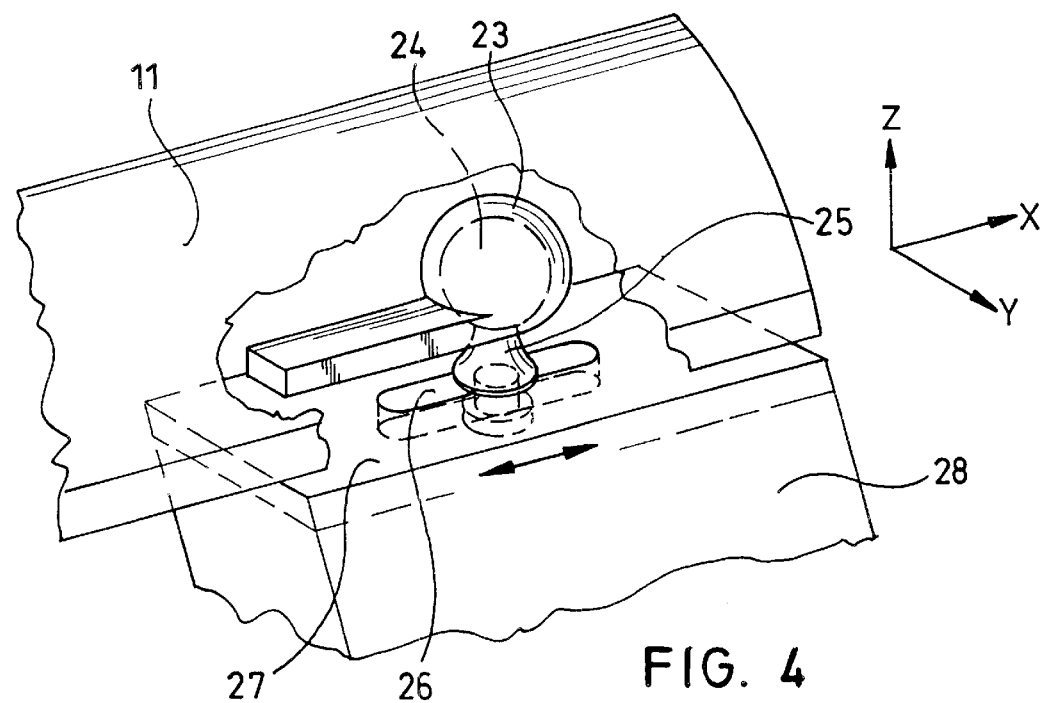
FIG. 4 shows a first embodiment of a catch lock of a side member in accordance with the invention in a vehicle convertible structure on the B column of the vehicle.
Figure 5:
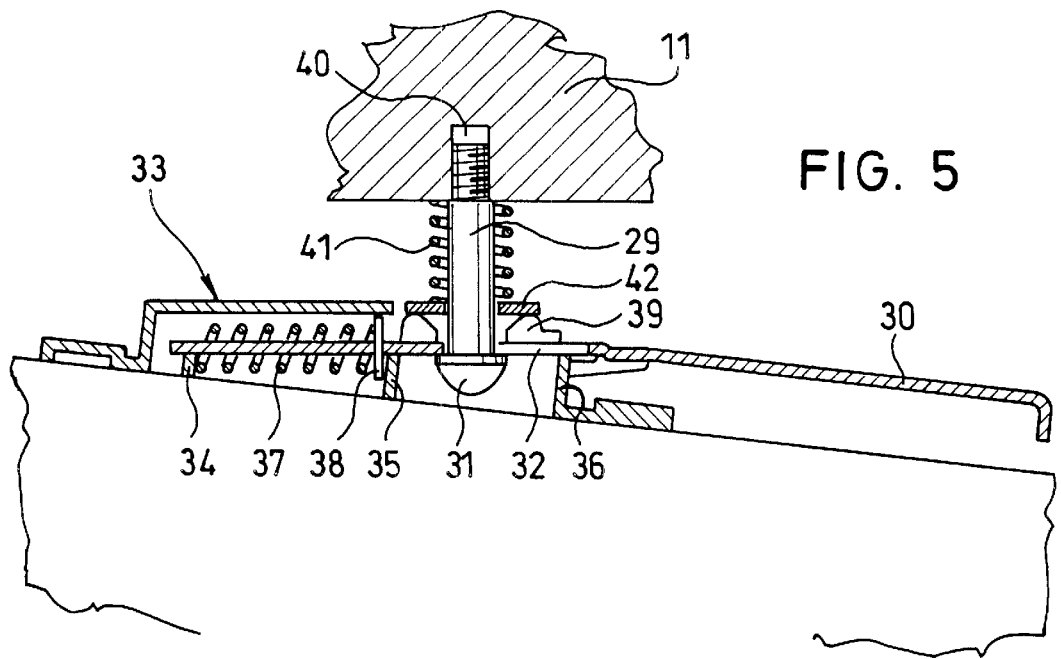
FIG. 5 shows a second embodiment of a catch lock of a side member in accordance with the invention in a vehicle convertible structure on the B column of the vehicle.

FIG. 2 shows the upper area of an A column 10. Furthermore, the front part of a side member 11 is shown. The side members in accordance with the invention are detachably joined to the A column 10 and the B column which is not shown in FIG. 2 (FIGS. 4 & 5). Alternatively to fastening to the A column, fastening to the front cross member (apron) of the vehicle is possible. The longitudinal axis of the side member 11 is labeled 12. Of the side member 11, only its support structure is shown; i.e., the lining of the side member is not shown.

The front end of the inner support structure of the side member 11 is made tapered and is joined integrally to a component of a ball joint, specifically, in the embodiment shown, to the ball cup 13 of this joint. The element of the ball bearing which interacts with the ball cup 13, the ball 14 is securely joined to the A column 10, from which the ball 14 projects in the direction toward the side member 11. For connection to the A column 10, the ball 14 is made integrally with a journal 15 which projects radially from it. The ball joint can be separated from the ball 14 by withdrawing the ball cup 13, and thus, the side member 11.

The ball joint itself enables rotations of the side member 11, simply limited by the journal 15, in numerous spatial directions. However, this free rotation capacity is unnecessary here and not desired. Rather it is enough, as will be detailed below, to be able to swivel the side member 11 transversely to its lengthwise axis 12 in a limited scope up and down in order to release the other end of the side member from the locking mechanism explained below or to lock it there. On the other hand, the side member 11, in the area of its front closed support, will be positioned so as not rotate with respect to its lengthwise axis 12 in order to perform its function as a component of the roof. To achieve these objectives, there is rotary lock for the ball joint. This rotary lock comprises another journal 16 which is preferably made integral with the ball cup 13, and with its front end which runs roughly parallel to the journal 15 which is formed integrally with the ball 14, is designed to fit into a recess 17 which is formed in the A column or on a brace which is attached there, as can be seen from the detailed representation FIG. 2A.

To prevent bending moments from being introduced into the side member 11 which sits in its front swivel bearing, in the embodiment shown in FIG. 1, it is provided that the other end of the side member 11, specifically the end of the side member 11 which lies to the rear relative to the B column, is supported with play, as is explained below and shown in FIGS. 4 & 5.

Figure 3:
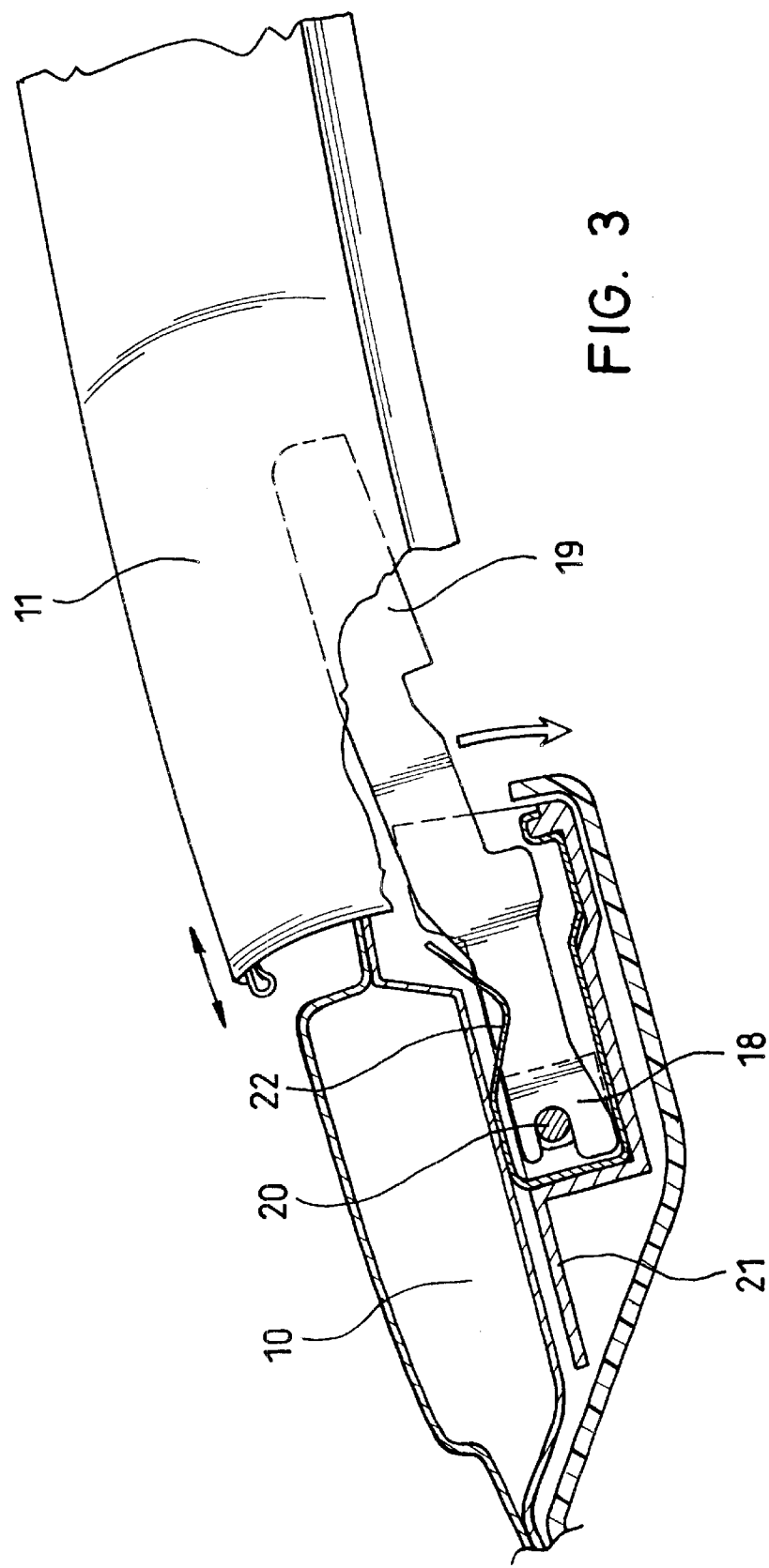
FIG. 3 shows a second embodiment of the closed support of a side member in accordance with the invention in a vehicle convertible structure on the A-column of the vehicle.

One alternative to the closed bearing shown in FIG. 2 is shown in FIG. 3. In this embodiment, the closed bearing is also formed on the front end of the side member 11, on the A column 10 and on the front cross member (apron). This closed bearing is based on a pivot connection with a pivot axis and a spring-loaded claw which extends over it with play. The claw 18 is located on the front end of a flange attachment 19 of the side comprised of the member 11 in the closed bearing embodiment shown in FIG. 3. Accordingly, the pivot axis 20 is securely joined to the A column 10. Likewise, a support frame 21 is securely joined to the A column 10 or the front cross member 2; on the one hand, this frame laterally borders the arrangement of the flange attachment 19 with a claw 18 on the side member 11, forward and below, and is not shown in FIG. 3, and on the other hand together with an opposite area of the A column 10 forms an abutment for a spring 22. The spring 22 is made as a leaf spring and is matched to the contour of the inside of the support frame 21 and the inside of the A column 10 which lies in the area of the support frame, is fixed at one end on the bottom of the support frame 21 and projects with the other end, proceeding from the A column 10, to the rear to abut the flange attachment 19 in order to prestress it relative to the pivot axis 20 and in the downward direction. This measure results in the side member 11, via its flange attachment 19 and the claw 18, being held elastically in a seat on the pivot axis 20. This compensates for the play which is provided between the claw 18 and the pivot axis 20 in order to prevent bending moments from being introduced into the side member 11 via the body. On the other hand, the elastic holding of the side member 1 1 by means of the spring 22 allows easy release of the catch engagement which is accessible by it when the side member 1 1 is pulled out of the closed bearing to the rear when slightly tilted up.

FIG. 4 shows a preferred embodiment of the catch lock for the side member 11, with a front end which has been closed, supported on the A column 10 and with the back end which can be detachably fixed on the B column by means of the catch lock and can be locked there. The catch lock comprises a catch element in the form of a ball head connection to a ball cup 23 which is joined securely to the side member 11 or the flange attachment thereof, and a ball 24 which is guided to be able to move in a slot 26 via a journal 25 which is formed integrally with it, which cup is formed in a support plate 27 on the top of the B column 28 of the vehicle body. The slot 26 runs parallel to the lengthwise axis 12 of the side member (see FIG. 2) and thus allows displacement of the journal 25 and thus the ball 24 of the ball joint in this direction, as illustrated by a double arrow in FIG. 4.

The catch lock, on the one hand, allows easy loosening or mounting of the side member 11 with its back end on the B column 28, and on the other hand, provides the required play for the floating support of the side member 11 in accordance with the invention relative to the vehicle body without introducing bending moments into the side member 11 in the area of the B column 28.

One alternative to the catch lock which is shown in FIG. 4 is shown in FIG. 5. There is a catch element there in the form of a pin 29 on the back end of the side member 11 which interacts with the detachable locking element which is located on the top of the B column 28 and has a stopper 30 with an engagement hole 32 for the head 31 of the pin 29. The stopper 30 extends parallel to the longitudinal axis 12 of the side member (see FIG. 2) and is guided to be able to move lengthwise in a guide frame 33 which is permanently connected to the B column 28. The front end of the stopper 30, which is made to drop off like a ramp in the forward direction, rests with its bottom on connectors 34, 35, and 36 which are spaced in the lengthwise direction and which form part of the guide frame 33 and with their top edges fix a ramp which drops off forward to guide the stopper 30. The stopper 30, in its front area, is surrounded by a compression spring 37 which is supported with one end on the guide frame 33 and with the opposite end on a stopper-mounted stop 38 which adjoins the center connector 35 when the stopper 30 is in the locked position, as is shown in FIG. 5.

In this position of the stopper 30, the head 31 of the pin 29 passes through the engagement hole 32 of the stopper 30 and fits behind the stopper 30 in the area of the engagement hole 32 with the annular edge on the bottom of the head 31 of the pin in the transition area of the head 31 to the pin 29. As follows from FIG. 5, engagement takes place between the bottom of the head 31 of the pin and the stopper 30 on the front edge area of the engagement hole 32 which is formed as an elongated hole with a lengthwise extension parallel to the lengthwise axis 12 of the side member in order, on the one hand, to provide the play necessary for the floating support of the side member 11 in the lengthwise direction, and on the other hand, in order to be able to release the head 31 of the pin by adjusting the stopper 30. For this purpose, the stopper 30 is pushed forward out of the locked position shown in FIG. 5 so that the head 31 of the pin disengages from the front edge of the engagement hole 32 and thereafter the side member 11 can be swung upwards.

In order to be able to securely engage the head 31 of the pin in the engagement hole 32 and regardless of twisting forces which may act on the body, there is a pin head guide 39 which is connected securely to the B column 28 and to the guide frame 33 and which is made of a sheet metal part which is formed as a guide funnel which is open in the center and which tapers in the downward direction towards the engagement hole 32.

Furthermore, it is provided that the side member 11 with the pin 29 released assumes a detectable raised position. For this purpose, the pin 29 which is securely joined to the side member 11 (for example, screwed into a receiving hole 40 thereof) is surrounded by a compression spring 41 which is joined by one end securely to the side member 11 and on the other end acts on a thrust washer 42 which is designed to adjoin with spring pre-tensioning the edge of the pin head guide 39 with its bottom when the pin head 31 fits into the engagement hole 32. In this state, the compression spring 41 is compressed. As soon as the pin head 31 disengages from the engagement hole 32 with corresponding unlocking activation of the stopper 30, the compression spring 41 is relieved as the thrust washer 42 continues to adjoin the top of the pin head guide 39 so that the side member 11 is visibly raised by spring force from its locking position.

All the above explained elements of the closed bearing on the front end of the side member and the catch lock on the back end of the side member can fundamentally be located on another part. For example, the pin of the catch lock can also be provided on the B column instead of on the side member and the catch slide and its assigned parts can be located on the side member. Furthermore, the closed bearing on the B column which lies to the rear and the catch lock can be located on the A column which lies to the front, can be reversed from the above explained embodiments. Instead of the A columns or the B columns, also other vehicle-mounted parts can also be used.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. Motor vehicle roof structure with at least one roof part which is movably guided at each lateral side area thereof and comprises side members which are detachably connected to vehicle-mounted parts by a catch lock locking mechanism having a plug-in element and locking element, the plug-in element being releasably retained by the locking element upon insertion of the plug-in element into the locking element.

2. Roof structure as claimed in claim 1, wherein the vehicle-mounted parts are A columns and B columns of a vehicle body.

3. Motor vehicle roof structure with at least one roof part which is movably guided at lateral side area thereof comprises side members which are detachably connected to vehicle-mounted parts by a plug-in and locking mechanism; wherein the vehicle-mounted parts are A columns and B columns of a vehicle body; and wherein the plug-in and locking mechanism provides for decoupling of the side members from the A columns and the B columns and provides floating support of the side members.

4. Motor vehicle roof structure with at least one roof part which is movably guided at a lateral side area thereof and comprises side members which are detachably connected to vehicle-mounted parts by a plug-in and locking mechanism; wherein the vehicle-mounted parts are A columns and B columns of a vehicle body; and wherein at each side of the roof, one of the A column and the B column has a plug-in bearing for one end of a respective one of the side members and the other of the A column and the B column has a catch lock for an opposite end of the respective one of the side members.

5. Roof structure as claimed in claim 4, wherein one of the plug-in bearings and the catch locks allows axial play for the respective one of the side members.

6. Roof structure as claimed in claim 4, wherein the respective plug-in bearing forms a receiver of one end of the side member which prevents rotation of the side member relative to a lengthwise axis of the side member, and the plug-in bearing allows pivoting of the respective side member transversely to the lengthwise axis of the side member when the catch lock of the other end of the side member is released.

7. Roof structure as claimed in claim 6, wherein the plug-in bearing has a ball head connection between the respective column and end of the side member, and a rotary lock for the ball head connection.

8. Roof structure as claimed in claim 7, wherein the rotary lock has a journal which fits into a recess.

9. Roof structure as claimed in claim 6, wherein the plug-in bearing has a pivot connection with a pivot axis which is transverse to the lengthwise axis of the side member and a claw which extends over the side member with play.

10. Roof structure as claimed in claim 9, wherein a spring is provided which presses the claw relative to the pivot axis.

11. Roof structure as claimed in claim 4, wherein the catch lock has a catch element and a locking element which detachably fixes it.

12. Roof structure as claimed in claim 11, wherein the catch element has a ball head connection which is movable in the lengthwise direction of the side member.

13. Roof structure as claimed in claim 11, wherein the catch element has a pin which fits behind a centering opening in a lock part which forms the locking element with play and is pre-tensioned by a spring.

14. Roof structure as claimed in claim 13, wherein the lock part is a component of a locking stopper which can be moved in a pin release position against the pre-tensioning of the spring and which is pre-tensioned in a locking position by a second spring.

15. Motor vehicle roof structure according to claim 1, wherein the side members are detachably connected at a first end area to a first vehicle-mounted part in a first manner by a plug-in member and is detachably connected and retained at second end area to a second vehicle-mounted part in a second manner by said catch lock locking mechanism.

* * * * *